Figure 1:
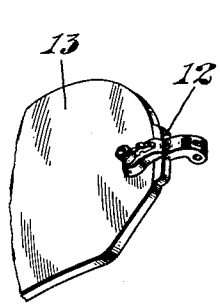

July 13, 1943.  E. H. RIMINGTON  2,324,273
OPHTHALMIC MOUNTING
Filed Dec. 6, 1941

INVENTOR
Elton H. Rimington
by Henway & Wetter
attys.

Patented July 13, 1943

2,324,273

UNITED STATES PATENT OFFICE 2,324,273

OPHTHALMIC MOUNTING

Elton H. Rimington, Beverly, Mass.

Application December 6, 1941, Serial No. 421,945

6 Claims. (Cl. 88—47)

This invention relates to ophthalmic mountings of the screwed connection type. It comprises an improved construction which includes novel provision for insuring positive locking of the screw head in any desired position of adjustment that may be required by the particular work in hand, at the same time permitting the screw to be quickly released and the connection separated into its parts for removal or repair should that become necessary or desirable.

The problem solved by my invention has engaged the attention of the optical industry for many years without satisfactory solution. The fragile character of the lens and the minute size of the metal parts of the mounting impose limitations that have heretofore necessitated the employment of constructions open to various objections. For example, it has been proposed to set the usual clamping screw with the proper tension and then solder it in place in the strap or to use cooperating soldered connectors, and while these expedients result in permanent connections they are extremely difficult to release and separate without damage to the mounting. Various lock washers and ratchet constructions have also been attempted, but these have the faults of exerting excessive pressure on the lens when the clamping screw is turned over the ridge or apex of the teeth and of loosening when final position is reached.

As distinguished from these previous constructions, all open to criticism on one ground or another, my invention comprises a soldered connection between the head of the clamping screw and an intermediate locking member which may be freed for releasing movement without danger to the lens or the straps of the mounting. To this end an important feature of my improved mounting consists in a locking member shaped to be inserted beneath the screw head and constructed and arranged to be itself fastened in stationary position by engaging a stationary part of the eyeglass assembly after the screw has been set, all independently of the screw threaded connection of the mounting.

In a preferred embodiment of the invention the locking member may be formed with a perforated washer portion shaped to underlie the head of the screw and a laterally projecting shank portion provided with a detent arranged to fit into a recess in the strap or to hook over a part of the lens or strap. The washer portion of the locking member may be soldered to the under side of the screw head after the screw has been set up and thus a permanent tight connection provided which will hold indefinitely without trace of looseness. On the other hand, when it is desired to release and separate the connection it is necessary only to clip off the shank portion of the locking member, whereupon the clamping screw is freed to be turned out of its clamping position. Preferably and as herein shown the projecting shank of the locking member is provided with an arched portion, or the strap of the mounting is provided with a recess, so that the shank will be separated in an intermediate section from the surface of the strap and may be conveniently reached and clipped when the connection is to be separated.

In an alternative embodiment of my invention the projecting shank may be omitted, the locking member fixed to the strap by a rib and groove connection, and a soldered bond provided, as before, between the screw head and the outer face of the locking member. This construction, like that first described, has the advantage of leaving the threads of the connection free of solder and is releasable without the application of excessive heat to the strap.

Figure 2:
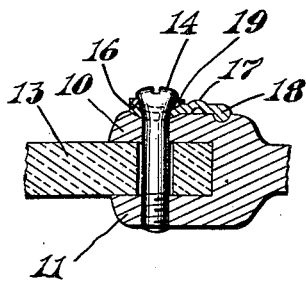
Figure 3:
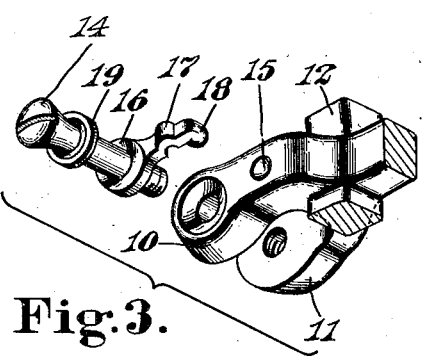
Figure 4:
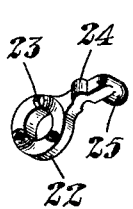
Figure 5:
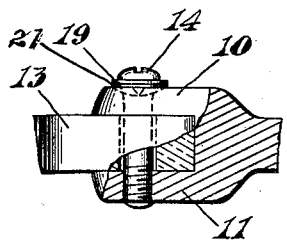
Figure 6:
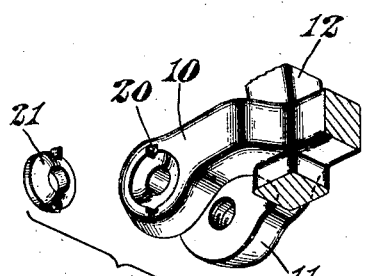
Figure 7:
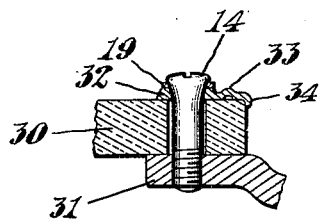

These and other features of the invention will be best understood and appreciated from the following description of several illustrative embodiments of the invention selected for purposes of illustration and shown in the accompanying drawing in which, Fig. 1 is a fragmentary view in actual size of portions of a lens and its mounting, Fig. 2 is an enlarged sectional view showing one form of my improved mounting, Fig. 3 is a fragmentary view in perspective of the separated parts of the same mounting, Fig. 4 is a view in perspective of a locking member of alternative design, Fig. 5 is a view partly in elevation and partly in section of a mounting of different construction, Fig. 6 is an exploded view showing the parts of the mounting shown in Fig. 5, and Fig. 7 is a sectional view showing the mounting of my invention applied to the "Balcrest" type of mounting.

In Figs. 1–3, 5 and 6 the mounting is shown as being of standard construction including the usual straps 10 and 11 which embrace the opposite faces of the lens and merge into a shoe 12 arranged to bear on the edge of the lens between the straps. In all these constructions the lens 13 is perforated to receive with clearance the body of the clamping screw 14. Both straps 10 and 11 of the mounting are also perforated to receive the screw, the latter being threaded into the lower strap 11 and passing freely through the upper strap 10. The upper strap is countersunk in its upper face about the screw hole and is provided with a small socket or recess 15 spaced laterally from the screw hole in its upper or exposed face.

Upon the face of the strap 10 is placed a locking member, which in this case comprises a perforated washer portion 16 and a thin laterally projecting shank having an intermediate arched portion 17 and a downturned detent or angular projection 18 at its outer end. The lower face of the washer portion 16 of this locking member is smooth and convexed to fit into the countersunk recess of the strap 10 and its upper face is correspondingly concaved. The detent 18 of the locking member is positioned in the recess 15 of the strap 10 and the locking member is thus positively held against rotation. Between the washer portion 16 of the locking member and the head of the screw 14 is provided a thin ring or washer of solder 19, convex on its lower face to fit the concave recess of the washer portion 16 and concave above to fit the convex contour of the screw head. The locking member may be stamped and formed out of sheet brass or other suitable material and in the drawing is shown in approximately four times its actual size.

In assembling this mounting the locking member is positioned as shown in Fig. 2 by straight line movement at right angles to the face of the strap with its detent interlocked with the strap, the screw 14 turned in until the desired degree of tension is reached and the solder washer is tightly compressed under the screw head. Then the head is heated to soften the solder and cause it to bond the head of the screw with the washer portion 16 of the locking member. For this soldering operation the necessary flux may be supplied or included in the solder washer 19. The mounting is thus made solid and permanent without any possibility of looseness in the parts and so remains unless it should be desired to separate the parts of the mounting. This may be readily and instantly effected by cutting or clipping the locking member through its arched section 17 where the material of the shank is reduced in cross section and elevated from the surface of the strap so that it may be conveniently reached. When clipped in this manner the locking member is free to turn with the screw and the latter may be retracted as desired.

In Fig. 4 is shown a locking member modified from that shown in Figs. 2 and 3 in that the concave upper face of its washer portion 22 is provided with shallow radial ribs 23 which serve as a support in the assembled mounting for the solder washer 19. As before, this locking member is provided with a laterally projecting shank having an arched portion 24 and a downturned detent 25. In practice it has been found that the ribs 23 facilitate the formation of a soldered bond between the screw head and the locking member. In effect, if the solder washer 19 is not completely fused it will embed itself upon the ribs 23 to such an extent that an interlocking connection is formed in that manner. Ordinarily, however, the ribs supply radial dams which tend to hold the molten solder in place.

In the modified form of the mounting illustrated in Figs. 5 and 6 the countersunk recess of the upper strap 10 is provided with a pair of grooves or slots 20 and a locking member 21 is employed which consists in a washer having a pair of radial or V-shaped ribs on its convex face shaped to fit into and interlock with the grooves in the countersunk recess. The thin ring of solder 19 is interposed between the head of the screw 14 and the lock washer 21.

In assembling the mounting shown in Figs. 5 and 6 the washer 21 is first seated in locking engagement with the strap 10 and then the clamping screw with the solder ring 19 under its head, is screwed down to the desired tension. The head of the screw 14 is then heated sufficiently to soften the solder of the ring 19 so that the latter in hardening forms a permanent bond between the under side of the screw head and the upper face of the lock washer 21. The clamping screw 14 is thus held permanently in position against the possibility of turning since it is bonded to the locking washer 21 which itself is prevented from turning by its interlocking rib and groove connection with the strap. If now it is desired to separate the connection it is necessary only to heat the head of the screw 14 sufficiently to soften the solder, whereupon the screw may be retracted without the necessity of turning the locking washer 21. It will be observed that in assembling and setting up the parts of this mounting it is not necessary to force the teeth of the lock washer over its seat in order that they may reach the corresponding grooves, and there is accordingly no looseness in the completed mounting.

The mounting shown in Fig. 7 is similar to that already described except that it comprises only a single strap 31 as is customary in standard mountings for thick lenses or lenses of pronounced curvature. In this case the locking member 32 is provided with a laterally projecting shank having an arched section 33 and a downturned end 34 arranged to hook over the rim of the lens 30. A solder ring 19 is again provided under the head of the screw 14 and in setting up the mounting a permanent bond is formed between the head of the screw and the locking member 32. Separation of the mounting may be effected by clipping off the end of the locking member as already explained or by bending or breaking.

It will be seen that the threaded connection of the clamping screw with the threaded strap in each of the illustrative embodiments fixes the screw in the proper longitudinal position to exert exactly the desired and carefully determined tension upon the parts of the connection, while the soldered union prevents rotation of the screw and so insures that the connection shall not be disturbed. On the other hand, the positive locking of the screw against turning may be terminated either by clipping the shank of the locking member or by releasing the solder bond in the screw head with the locking member shown in Fig. 5. Thus the screw may be retracted without in any way impairing the thread in the strap or damaging its construction or appearance. In reestablishing the eyeglass assembly a new clamping screw and locking member may be supplied and a practically new mounting thus secured.

A feature of my invention which contributes to its success is that the solder present in the head of the clamping screw is not displaced nor does it tend to run out when softened but remains in place due to surface tension or other causes so that there is no appreciable relaxation in the tension of the clamping screw, between the time it is set up with the desired tension and the time the soldered bond is completed. It is to assist this phenomenon of retaining the molten solder in place that the surface of the locking member immediately beneath the screw head is countersunk or recessed.

Having thus disclosed my invention and for illustrative purposes described specific embodiments thereof, I claim as new and desire to secure by Letters Patent:

1. An ophthalmic mounting comprising a strap having a countersunk screw hole and a recess in its outer surface spaced from the screw hole, a screw inserted in said hole, a locking member having a portion convexed to fill the countersink in the strap and perforated for the passage of the screw and also a projecting shank having an intermediate arch and a detent shaped to enter the said recess and hold the member in place without tension, the arrangement of said convexed portion, detent and recess with respct to the countersink being such that said locking member may be fitted into its interlocking position by substantially straight line movement, and a soldered connection between the screw head and said locking member.

2. An ophthalmic mounting including a perforated strap having a recess in its outer surface spaced from its perforation, a clamping screw, and a locking member having a circular body fitting under the screw head and a radially extending shank provided with a detent at its outer end fitting into said recess, the arrangement of the circular body, shank, detent, and recess with respect to the perforated portion of the strap being such that the locking member may be fitted into its operative position by substantially straight line movement, said member having an intermediate portion arched out of contact with the surface of the strap.

3. An eyeglass mounting comprising a perforated strap, a clamping screw extending into the strap, and a locking member soldered under the screw head and having a laterally projecting arm with an angular end portion shaped to engage a fixed part of the eyeglass at a distance from the screw and to hold the member in place without tension, and an intermediate portion maintained out of contact with the strap where it may be conveniently clipped to release the screw for turning, the arrangement of said end portion with respect to the perforation and the fixed part of the eyeglass being such that the locking member may be engaged in operative position by substantially straight line movement.

4. An eyeglass mounting having opposed straps drilled and tapped to receive a clamping screw, the outer face of one strap having both a countersunk recess and a socket spaced therefrom, the axes of said recess and said socket being substantially parallel, a clamping screw in the straps, an anchor lug fitting in the countersunk recess, perforated to receive the screw and having an extension entering the said socket in the outer face of the strap and being thereby held without tension against rotation, and a soldered connection between the screw and said anchor lug the screw being otherwise freely rotatable with respect to said lug.

5. An eyeglass mounting having a strap, a clamping screw threaded into the strap, a locking member having a soldered washer portion and a laterally projecting arm with an angular end arranged to interlock with a stationary part of the eyeglass assembly, said arm having a portion located intermediate the angular end and the portion connected by solder, said intermediate portion being arched out of contact with the strap, the arrangement being such that said locking member may be moved to interlock with the strap and to a position to be soldered to the screw without tension, the soldered connection between the screw head and said locking member holding the screw against turning while the locking member is positively held against turning by its said interlocking connection.

6. An eyeglass mounting having a strap, a clamping screw threaded into the strap, a locking member having a soldered washer portion and a laterally projecting arm with an end shaped to interlock with a stationary part of the eyeglass assembly, said arm having a portion located intermediate its end and the portion connected by solder, said intermediate portion being arched out of contact with the underlying surface of the eyeglass assembly, the arrangement being such that said locking member may be moved without tension to interlock with the said stationary part of the eyeglass assembly and to a position to be soldered to the screw, the soldered connection between the screw head and said locking member holding the screw against turning, while the locking member is positively held against turning by its said interlocking connection.

ELTON H. RIMINGTON.